(12) United States Patent
Kaukler et al.

(10) Patent No.: US 10,117,380 B1
(45) Date of Patent: Nov. 6, 2018

(54) SYSTEMS AND METHODS FOR REDUCING CUTTING BLADE NOISE

(71) Applicants: William Kaukler, Huntsville, AL (US); Wayne Thompson, Huntsville, AL (US)

(72) Inventors: William Kaukler, Huntsville, AL (US); Wayne Thompson, Huntsville, AL (US)

(73) Assignee: Board of Trustees of the University of Alabama, for and on behalf of the University of Alabama in Huntsville, Huntsville, AL (US)

( * ) Notice: Subject to any disclaimer, the term of this patent is extended or adjusted under 35 U.S.C. 154(b) by 43 days.

(21) Appl. No.: 15/156,016

(22) Filed: May 16, 2016

(51) Int. Cl.
  *A01D 34/82* (2006.01)
  *A01D 34/73* (2006.01)
  *A01D 101/00* (2006.01)

(52) U.S. Cl.
  CPC .......... *A01D 34/826* (2013.01); *A01D 34/73* (2013.01); *A01D 2101/00* (2013.01)

(58) Field of Classification Search
  CPC .............................. A01D 34/826; A01D 34/73
  See application file for complete search history.

(56) References Cited

U.S. PATENT DOCUMENTS

| | | | | |
|---|---|---|---|---|
| 3,022,621 A | * | 2/1962 | Zavarella | A01D 34/73 30/355 |
| 3,214,896 A | * | 11/1965 | Watkins | A01D 34/73 30/351 |
| 4,254,607 A | | 3/1981 | Moore | |
| 5,012,633 A | * | 5/1991 | Ito | A01D 43/077 56/12.9 |
| 5,163,276 A | * | 11/1992 | Mohrman | A01D 34/73 56/255 |
| 5,233,820 A | | 8/1993 | Willsie | |
| 5,363,635 A | | 11/1994 | White, III et al. | |
| 5,899,053 A | * | 5/1999 | Roth | A01D 34/73 56/255 |

(Continued)

FOREIGN PATENT DOCUMENTS

| | | | | |
|---|---|---|---|---|
| CA | 2071627 A1 | * | 12/1993 | ............ A01D 34/73 |
| GB | 2176683 A | * | 1/1987 | ............ A01D 34/73 |

OTHER PUBLICATIONS

Wind Energy Institute of Canada, "WhalePower Tubercle Blade Power Performance Test Report," Whale Power Corporation, Jul. 2008, pp. 1-37.

*Primary Examiner* — Alicia Torres
*Assistant Examiner* — Adam J Behrens
(74) *Attorney, Agent, or Firm* — Maynard Cooper & Gale, P.C.; Jon E. Holland

(57) ABSTRACT

A cutting blade for use in a lawnmower or other cutting device has a contoured leading edge profile that forms a series of protrusions and contoured notches. Each contoured notch has a surface that is smooth and contoured such that air is funneled through the contoured notch by the adjacent protrusions, thereby causing the air to form vortices at the surface of the blade. The formation of the vortices helps the airflow to adhere to the blade surface rather than separate from it, thereby creating a more laminar streamlined flow that merges with air flowing over the opposite side of the blade at the trailing edge. By preventing the airflow from separating from the blade surface over a substantial portion of the blade, turbulence is significantly reduced. Thus, noise generated by the blade is significantly reduced as well. In addition, the blade experiences less drag, and the performance of the blade and lawnmower is generally increased.

34 Claims, 8 Drawing Sheets

(56) References Cited

U.S. PATENT DOCUMENTS

| | | | | |
|---|---|---|---|---|
| 6,052,979 A | * | 4/2000 | Tutschka | A01D 34/005 56/17.5 |
| 6,431,498 B1 | | 8/2002 | Watts et al. | |
| 6,655,119 B2 | | 12/2003 | Hasei et al. | |
| 7,299,612 B2 | * | 11/2007 | Schuyler | A01D 34/73 56/255 |
| 8,037,612 B2 | * | 10/2011 | Hansen | B26B 3/00 30/165 |
| 2006/0168933 A1 | * | 8/2006 | Hill, Jr. | A01D 34/73 56/295 |
| 2006/0213342 A1 | * | 9/2006 | Turner | A01D 34/005 83/13 |
| 2007/0227113 A1 | * | 10/2007 | Schuyler | A01D 34/73 56/255 |
| 2009/0074578 A1 | | 3/2009 | Dewar et al. | |
| 2011/0006165 A1 | | 1/2011 | Ireland | |
| 2011/0006166 A1 | | 1/2011 | Ireland | |
| 2014/0182257 A1 | * | 7/2014 | von Rentzell | A01D 34/73 56/289 |
| 2016/0073582 A1 | * | 3/2016 | Stoffel | A01D 34/73 56/295 |
| 2016/0360695 A1 | * | 12/2016 | Klackensjo | A01D 34/73 |
| 2017/0325401 A1 | * | 11/2017 | Chang | A01D 34/73 |

\* cited by examiner

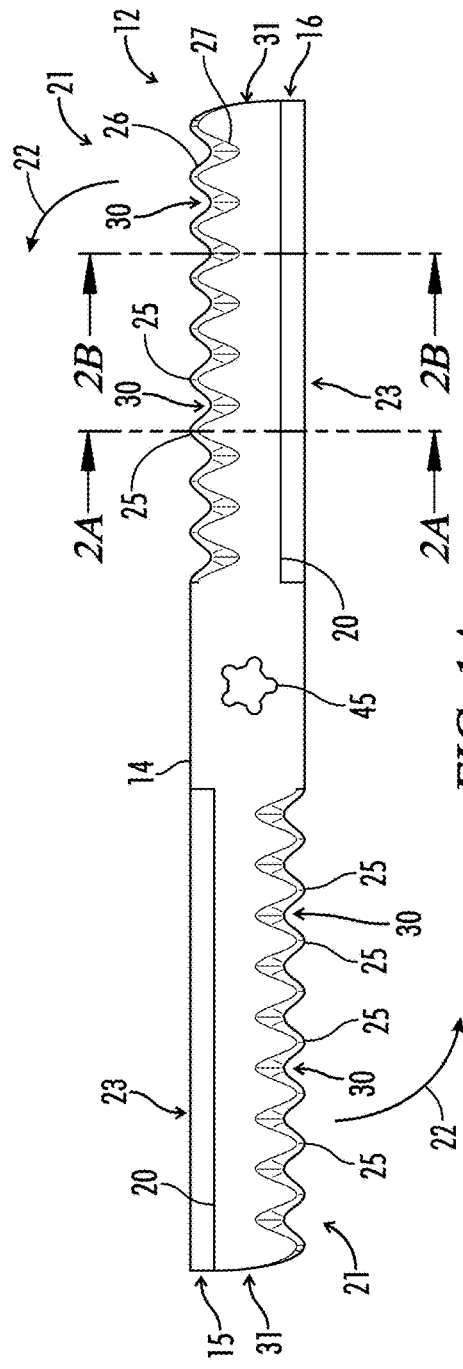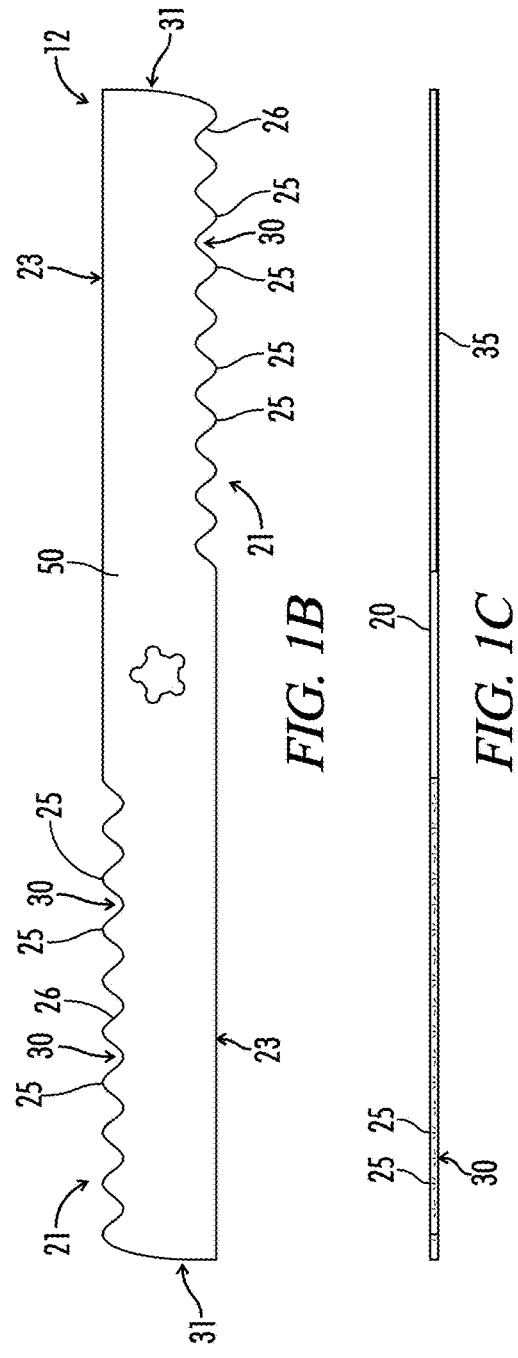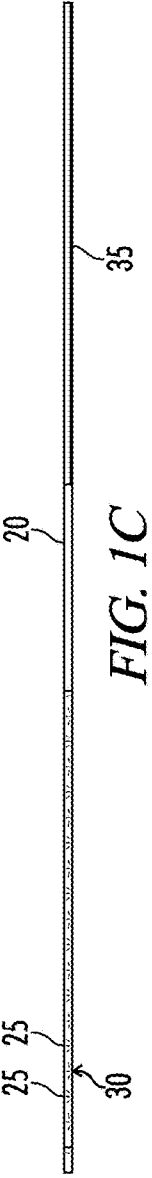

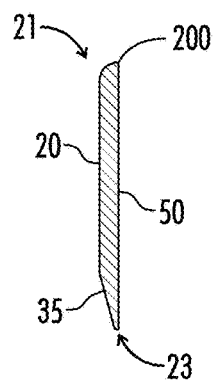
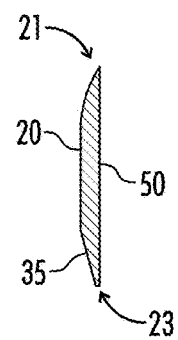
*FIG. 2A*  *FIG. 2B*
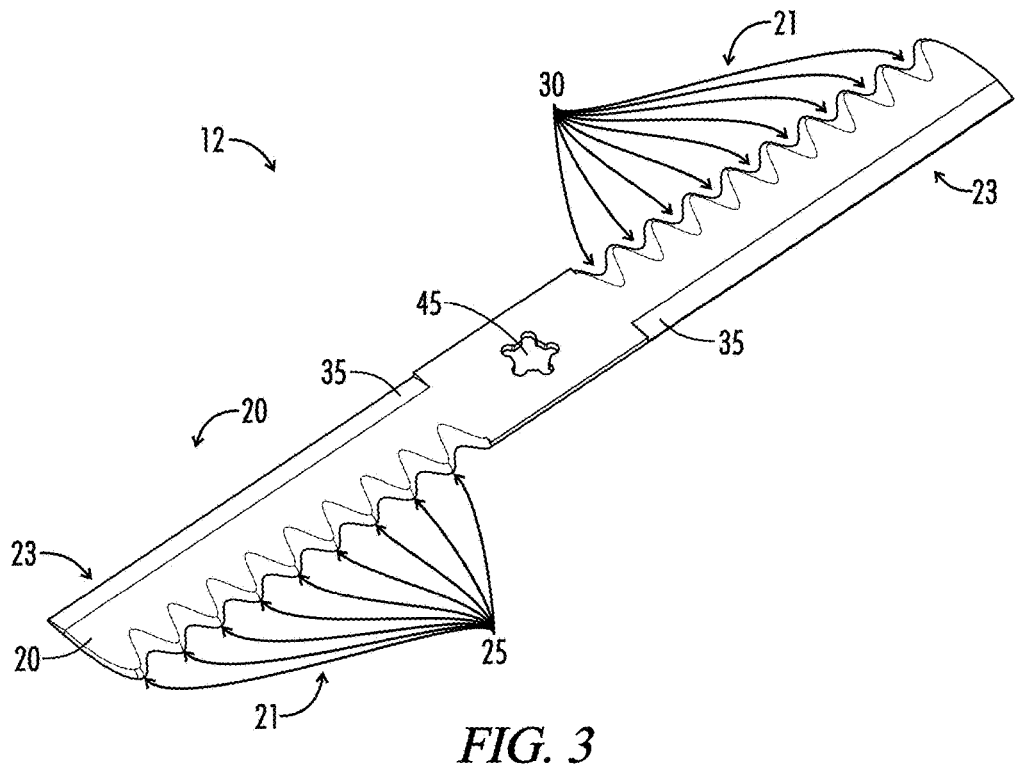
*FIG. 3*

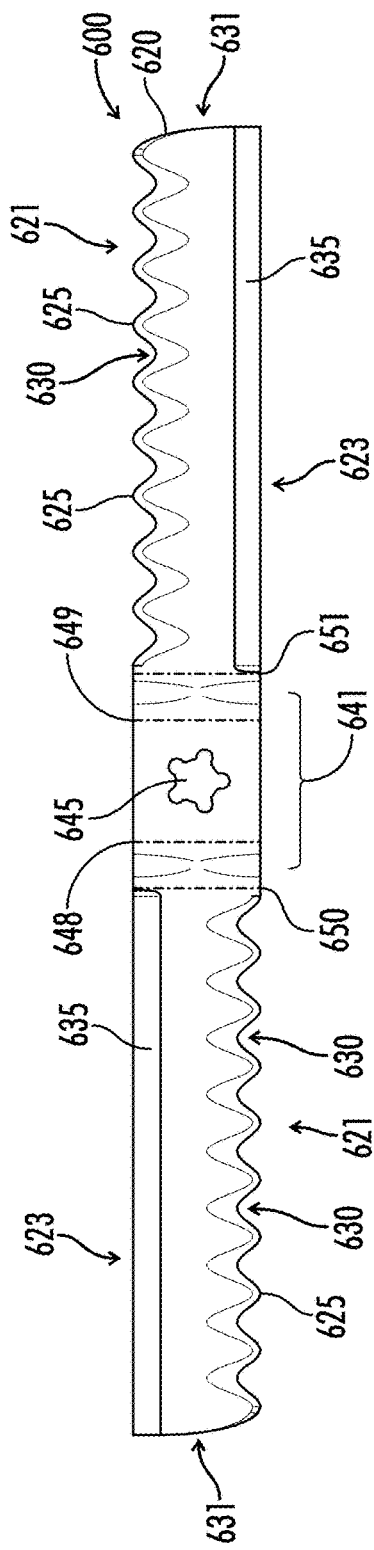
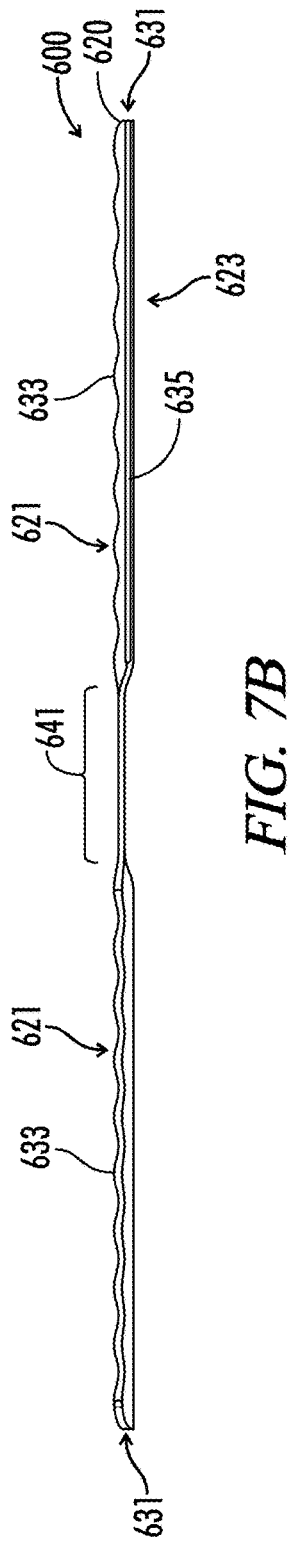

SYSTEMS AND METHODS FOR REDUCING CUTTING BLADE NOISE

RELATED ART

Conventional lawnmowers and other cutting devices generate considerable noise levels when in use. Rules and regulations enacted by various governments and authorities limit the amount of noise a lawnmower can permissibly generate while in use. For example, some rules prevent sale of lawnmowers or weed trimmers that generate noise that exceeds a maximum level of decibels (dB) while in use. Additionally, users whose lawnmowers or other cutting devices violate applicable noise restrictions may face penalties, such as fines. Compliance with such regulations and restrictions can often be achieved by reducing the speed of the cutting blade during operation, but such a solution adversely impacts performance. Thus, in general, designs of lawnmowers and other cutting devices capable of high performance with reduced noise are generally desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIG. 1A depicts a bottom view of an exemplary embodiment of a cutting blade.

FIG. 1B depicts a top view of an exemplary embodiment of a cutting blade, such as is depicted by FIG. 1A.

FIG. 1C depicts a side view of an exemplary embodiment of a cutting blade, such as is depicted by FIG. 1A.

FIG. 2A is a cross-sectional view of a cutting blade, such as is depicted by FIG. 1A.

FIG. 2B is a cross-sectional view of a cutting blade, such as is depicted by FIG. 1A.

FIG. 3 is a three-dimensional perspective view of an exemplary embodiment of a cutting blade.

FIG. 7A is a plan view of an exemplary embodiment of a twisted lawnmower blade.

FIG. 7B depicts a side view of an exemplary embodiment of a lawnmower blade, such as is depicted by FIG. 7A.

DETAILED DESCRIPTION

Figure 4A:
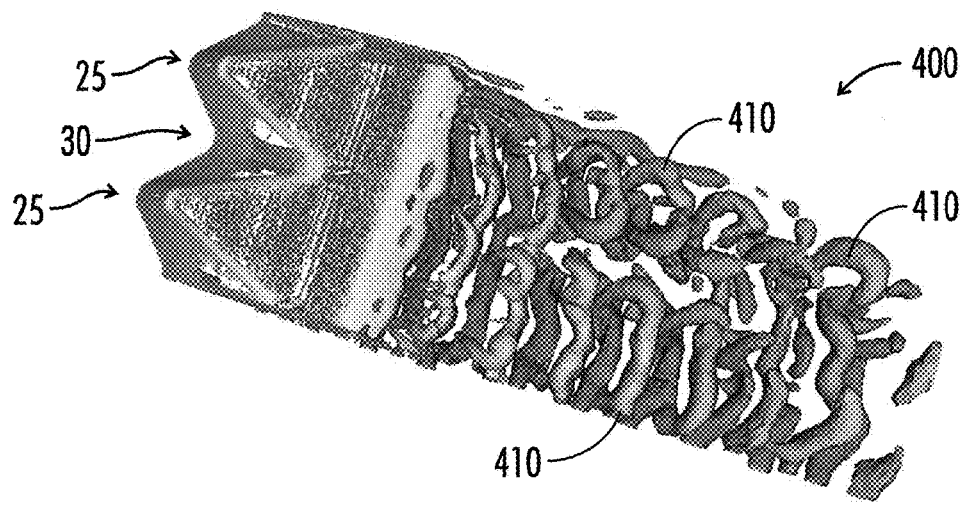
FIG. 4A depicts velocity contours of air passing over a bottom face of a cutting blade, such as is depicted by FIGS. 1A-1C, at a zero-degree angle of attack.

Conventional rotary cutting blades generate considerable noise levels when in use. This is due, in substantial part, to a presence of highly turbulent air flowing over the blades as they spin. A turbulent flow of air around or over a blade generally produces noise because of aerodynamic forces. It has been observed through aerodynamic testing that a blade with two flat parallel surfaces, that is, a blade with no camber, generates turbulence in airflow passing over its leading edge and experiences increased drag forces. A rotary cutting blade with this shape also generates highly turbulent airflow when the blade is engaged, resulting in high levels of noise while the blade is in use. It has been discovered that the noise resulting from a spinning cutting blade in a lawnmower accounts for a significant portion of the overall noise generated by the lawnmower during operation.

The present disclosure generally pertains to systems and methods for reducing cutting blade noise. It has been observed that Humpback whales have knobby, rounded protrusions, referred to as "tubercles," on their flippers. Various studies have shown that a tubercled flipper has less stalling at a higher angle of attack with reduced turbulence, suggesting that the presence of these tubercles improves the whale's swimming capabilities. By configuring a rotary cutting blade to mimic the characteristics of tubercles on the flippers of Humpback whales, it is possible to realize a reduction in turbulent airflow around the blade resulting in quieter and better performance, as will be described in more detail below.

In one exemplary embodiment, a rotary cutting blade has a notched leading edge profile that forms a series of protrusions (peaks) and contoured notches (valleys) similar to the tubercles and phalangic grooves of a Humpback whale. When the blade is in use, the blade spins about a spindle passing through a hub located in the center of the blade. As airflow passes over the blade, the blade's leading edge subdivides the airflow and funnels it into a plurality of contoured notches between adjacent protrusions. Specifically, adjacent protrusions funnel air through a contoured notch between the protrusions. Such notch has a surface that is smooth and contoured such that the surface preferably has no sharp edges exposed to the airflow and the air remains substantially laminar as it flows through the notch. Further, the contour of the notch produces at least one vortex that helps the air to adhere to the surface of the blade from the contoured notch to the trailing edge further helping to reduce turbulence, as will be described in more detail below. In some embodiments, the contoured notch may produce a pair of counter-rotating vortices, but other numbers of vortices are possible.

The formation of a vortex in the airflow passing through a contoured notch helps the airflow to adhere to the blade surface rather than separate from it, thereby creating a more laminar streamlined flow that merges with air flowing over the opposite side of the blade at the trailing edge. By preventing the airflow from separating from the blade surface over a substantial portion of the blade, turbulence is significantly reduced. Thus, noise generated by the blade is significantly reduced as well. In addition, the blade experiences less drag, and the performance (e.g., efficiency) of the blade and rotary device is generally increased, for example, requiring less power to spin the blade, lowering fuel consumption required to spin the blade, and reducing vibration generated during use.

FIG. 1A depicts an exemplary embodiment of a lawnmower blade 12. The blade 12 has an elongated blade body 14 having one end 15 that is opposite another end 16. The body 14 has a generally flat and smooth bottom face 20 with a generally rectangular shape and uniform thickness. Extending from each end 15 and 16 is a respective leading edge 21 and trailing edge 23 with features positioned on the leading edge 21 and trailing edge 23 as described further below. Note that when the lawnmower blade 12 is in use (i.e., spinning during operation for cutting blades of grass), the lawnmower blade 12 is rotating in the direction of the leading edge 21 about an axis such that the leading edge 21 cuts the grass blades. Reference arrows 22 show the direction of rotation in FIG. 1A. As with conventional lawnmower blades, the blade 12 in the exemplary embodiment depicted by FIG. 1A is configured to cut grass by rotating or spinning about a central axis; that is, an axis passing through a point that is approximately the center of mass the blade 12 and perpendicular to the blade's longitudinal axis. Note that, in other embodiments, the blade 12 may rotate about an axis that is located at other locations on the blade 12. In some embodiments, the blade 12 may be adapted for use with weed trimmers, edgers, or other devices.

In an exemplary embodiment, the blade 12 is composed of a metallic material (e.g., 1040 carbon steel alloy), but other materials or combinations of materials suitable for cutting grass may be used in other embodiments. For example, in some embodiments, the blade 12 may comprise several materials, such as when the blade 12 is a composite. In other embodiments, the blade 12 comprises a polymer and may be formed using injection molding techniques or other conventional manufacturing methods. In an exemplary embodiment, the blade 12 is approximately between 20 and 26 inches long and approximately between 1.5 and 4 inches wide at its widest point. Other dimensions of the blade 12 are possible in other embodiments. Note that, unlike an airfoil, the blade 12 has no (zero) camber and, thus, does not generally generate any appreciable lift from aerodynamic forces, although it is possible for the blade 12 to have camber and generate lift in other embodiments, if desired.

In the exemplary embodiment shown by FIG. 1A, each leading edge 21 of the blade 12 is notched to form a plurality of contoured notches 30, which may be referred to as "grooves," and protrusions 25, which may be referred to as "tubercles." Each pair of adjacent protrusions 25 is separated by a respective contoured notch 30 corresponding to the tubercles and phalangic grooves of a Humpback whale flipper. The alternating protrusions 25 and contoured notches 30 form a generally sinusoidal shape on the leading edge 21 when viewed from above. In this regard, the alternate protrusions 25 and contoured notches 30 form a wavy or sinusoidal pattern on the leading edge 21, as will be described in more detail below. In other embodiments, other patterns may be formed.

To form the contoured notches 30 and protrusions 25, casting, cutting, forming, grinding or stamping operations (or any combination thereof) may be performed on the leading edge 21 such that the leading edge forms a sinusoid 26, referred to as "upper sinusoid," in the top face 50 of the blade 12 (along the leading edge 21) and an edge of the bottom face 20 forms a parallel sinusoid 27, referred to as "lower sinusoid." In an exemplary embodiment, the sinusoids 26 and 27 have the same period and phase but have different amplitudes, and are offset or shifted along a chord line of the blade 12 running from the leading edge 21 to the trailing edge 23. However, the characteristics of the sinusoids 26 and 27, such as amplitudes, periods and phases may differ in other embodiments. Further, the portion of the blade 12 between the sinusoids 26 and 27 is smoothed to create a contoured surface that helps to reduce turbulence. The difference in amplitudes of the sinusoids 26 and 27 controls the slope of the notch surface from the bottom sinusoid 27 to the upper sinusoid 26 and the depth of the contour (i.e., phalangic groove) of the contoured notch 30. This sloped surface of the contoured notch 30 forms a series of parallel sinusoids between the upper sinusoid 27 and the lower sinusoid 26 such that each successive sinusoid in the direction from the bottom face 20 to the top face 50 has the same period and phase (which respectively match the period and phase of the sinusoids 26 and 27) but a smaller amplitude. In other embodiments, variations in the periods, phases, and/or amplitudes of the sinusoids may be possible, and it may be possible to use shapes or curves other than sinusoids to form the features that control air flow in the manner described herein.

In an exemplary embodiment, the sinusoids 26 and 27 have amplitudes that are approximately between 0.2 and 0.44 of the width of the blade 12 (i.e., the distance from the leading edge 21 to the trailing edge 23), preferably about one-third the width of the blade 12. For example, in one embodiment, a 21-inch long blade 12 has a plurality of protrusions 25 and contoured notches 30 that form a sinusoid along the leading edge 21 having an amplitude of about 0.375 inches. In one embodiment, the chord length is between about 1.5 inches to about 4 inches. Other dimensions of the sinusoids and blade 12 are possible in other embodiments. Note that the amplitude of the sinusoid 27 may be dependent upon a thickness of the blade 12. In one embodiment, the sinusoid 27 is set back from the sinusoid 26 by about ⅜ to ¼ of an inch from sinusoid 26 for a blade 12 having a thickness of about ⅕ to ⅓ of an inch, and the amplitude of the sinusoid is about 0.875 inches. In other embodiments, other dimensions are possible. Note also that, in an exemplary embodiment, the blade 12 has between six and ten corresponding protrusions 25 and contoured notches 30 positioned on each leading edge 21. For a 21-inch blade 12, the protrusions 25 and contoured notches 30 may extend approximately 9.5 inches across each leading edge 21, although other dimensions are possible. The blade 12 shown by FIG. 1A has nine protrusions 25 and nine corresponding contoured notches 30 positioned on each leading edge 21, but other numbers of protrusions 25 and contoured notches 30 are possible in other embodiments.

Note also that, in an exemplary embodiment such as is depicted by FIG. 1A, the protrusion 25 furthest from a blade hub 45 for each leading edge 21 forms at least a part of a distal end 15 or 16 of the blade 12. The outer edge 31 of such protrusion 25 is curved so that the distal end 15 or 16 is rounded and smooth. It has been observed that centrifugal pumping of air (sometimes referred to as "spanwise pumping") as the blade 12 spins causes airflow to be thrown off the blade 12 at distal ends 15 and 16 in a turbulent tip vortex, which increases noise generation levels dramatically, for example, as occurs when a listener hears a conventional helicopter rotor spinning. In the instant embodiment, the smooth shaping of the edges of the distal ends 15 and 16 of the blade 12 reduces turbulence in the tip vortices, thereby reducing the amount of noise generated by tip vortices while the blade 12 is spinning.

In the embodiment shown by FIGS. 1A-C and 2A-B, each trailing edge 23 is beveled. That is, at each trailing edge 23 of the blade 12 forms a bevel 35 that slopes or tapers from the roughly flat bottom face 20 toward the trailing edge 23. By gradually reducing the thickness of the blade toward the trailing edge 23, turbulence is reduced at the trailing edge 23 where the air flowing over the top face 50 meets the air flowing over the bottom surface 20.

Note that the slope of each bevel 35 of the exemplary embodiment depicted by FIG. 1A is roughly constant. In some embodiments, each bevel 35 tapers toward its respective trailing edge 23 at a constant angle (e.g., around 15°) along the width of the blade 12. In this regard, the bevel 35 begins sloping or tapering from a point on the bottom face 20 that is between the approximate center line of the blade 12 (i.e., its longitudinal axis) and the trailing edge 23, although the bevel 35 may begin sloping or tapering form other points. In other embodiments, other dimensions and configurations of the bevel 35 are possible, and it is not necessary, in particular, for the bevel 35 to have a constant slope or taper.

Note that blade 12 has a hole 45, referred to herein as a "blade hub," for generally accommodating a spindle (not shown in FIGS. 1A-C). In the embodiment shown by FIG. 1A, the blade hub 45 is located approximately in the center of the blade 12 (i.e., approximately its center of mass), and passes completely through the blade 12. In some embodiments, clamps, fasteners, latches, pins, grooves, or other devices (not shown) for coupling the blade 12 to a spindle (not shown in FIGS. 1A-C) may be used, as known in the art, so that torque from the spindle is transferred to the blade 12 to cause the blade 12 to spin. Note that in the embodiment shown by FIG. 1A, the blade hub 45 is shaped similarly to a pentagon with rounded corners, but other shapes of the blade hub 45 are possible in other embodiments.

FIG. 1B depicts a top view of an exemplary embodiment of the blade 12. Note that the leading edge 21 depicted by FIG. 1B is notched to form a plurality of protrusions 25 that are separated by contoured notches 30, as described above for FIG. 1A. The blade 12 comprises a top face 50 that is substantially flat and smooth. In one embodiment, the face 50 is smooth and is finished to reduce drag, but other profiles and finishes of the face 50 are possible in other embodiments.

FIG. 1C depicts a side view of an exemplary embodiment of the blade 12. As shown by FIG. 1C, the blade 12 has a substantially flat bottom face 20 and top face 50, such that the blade 12 appears to have a substantially rectangular edgewise profile when viewed from its edge, such as is depicted by FIG. 1C. Note that, in some embodiments, the blade 12 has uniform thickness, except at the contoured notches 30 and bevels 35, and is substantially flat when viewed from its leading edge 21 or trailing edge 23. However, in other embodiments, the blade 12 may be flexed or twisted about a longitudinal axis of the blade 12. In this regard, in embodiments in which the blade 12 has two leading edges 21 on opposing sides of the blade 12 and a central blade hub 45 (as depicted by FIGS. 1A and 1B), the respective ends of the blade 12 may be twisted or flexed such that each leading edge 21 is tilted downward. Note that the twisting helps to create lift that tends to pull grass blades up and away from the cutting area, thereby improving cutting performance. Note also that each of the respective leading edges 21 may be tilted downward, that is, towards the surface of the ground.

FIG. 2A depicts a cross-sectional view of an exemplary embodiment of the blade 12, where the cross section is taken through the middle of a protrusion 25. In the exemplary embodiment depicted in FIG. 2A, the leading edge 21 forms a sharp tip 200 for facilitating grass cutting. In this regard, the sharpness of the tip 200 along the leading edge 21 forms a lengthwise cutting edge that helps to cut grass that comes into contact with the tip 200 as the blade 12 is spinning. At each protrusion 25 (i.e., each "tubercle"), the top face 50 extends horizontally from the tip 200, and the face of the leading edge 21 between the bottom face 20 and the tip 200 is rounded in the manner shown such that the leading edge 21 has a "bullnose" profile. Thus, the leading edge 21 facing the oncoming air is rounded and smooth, helping to keep the airflow laminar. Note that the arrangement of contoured notches 30 ("phalangic grooves") and protrusions 25 ("tubercles") results in a cutting edge that is significantly longer than that of a conventional lawnmower blade of the same size. It is believed that this longer, curved cutting edge helps the blade 12 to "slice" more neatly through grass blades when the blade might otherwise "chop" or "break" blades bluntly, creating jagged, uneven cut heights and diminishing lawn health. It is further believed that this longer, curved cutting edge will permit the blade 12 retain its sharpness. Note also that it is unnecessary for the trailing edge 23 to have a sharp tip or edge since it is not used for grass cutting. In one embodiment, the bevel 35 has a relatively constant slope of about 15° relative to the top face 50 sloping down to the trailing edge 23, which has a thickness of about 0.03 inches. In other embodiments, other dimensions are possible.

FIG. 2B depicts a cross-sectional view of an exemplary embodiment of the blade 12, where the cross section is taken through the middle of a contoured notch 30 between two adjacent protrusions 25. As can be seen by comparing FIGS. 2A and 2B, the leading edge 21 of FIG. 2B is slightly less rounded relative to the leading edge 21 of FIG. 2A such that the leading edge 21 of FIG. 2B has a more downward sloping profile. Further, the surface profile of the contoured notch 30 is generally tubular in that the adjacent protrusions 25 gently slope downward in a curved fashion with a smooth contour to the middle of the contoured notch 30, as shown by FIG. 5.

FIG. 3 depicts a three-dimensional perspective view of an exemplary embodiment of the blade 12. The blade shown by FIGS. 1A-C, 2A-B, and 3 is not twisted such that the leading edges 21 are at a 0° angle of attack. A twisted blade will be described below with reference to FIGS. 7A-B. Note that, in the exemplary embodiment of FIG. 3, the blade 12 comprises a generally flat bottom face 20, as depicted in FIGS. 1A and 1B and described above. Additionally, the blade 12 depicted by FIG. 3 has leading edges 21 and trailing edges 23 on opposite sides of the hub 45. Each leading edge 21 of the instant embodiment forms nine protrusions 25 and nine contoured notches 30, though, as indicated above, other numbers of protrusions 25 and contoured notches 30 are possible in other embodiments.

Note that the hub 45 shown by FIG. 3 is depicted as a star-shaped hole that passes completely through the blade 12. In this regard, the hub 45 is shaped to receive a spindle (not shown) passes completely through the blade 12. Torque is transferred from the spindle (not shown) to the blade 12 so that the blade 12 undergoes rotation when the spindle (not shown) is turning. Note also that a plurality of contoured notches 30 is shown. Generally, with the exception of contoured notches 30 closest to the hub 45, each contoured notch 30 is between adjacent protrusions 25 and has a curved surface that is configured to channel air between the adjacent protrusions 25 and over the bottom face 20 of the blade 12. In this regard, the curved contour of each contoured notch 30 causes air passing through the notch between adjacent protrusions 25 to rotate, forming one or more vortices that help to prevent the airflow from separating from the surface of the blade 12, thereby promoting laminar flow and reducing turbulence and noise.

Figure 4B:
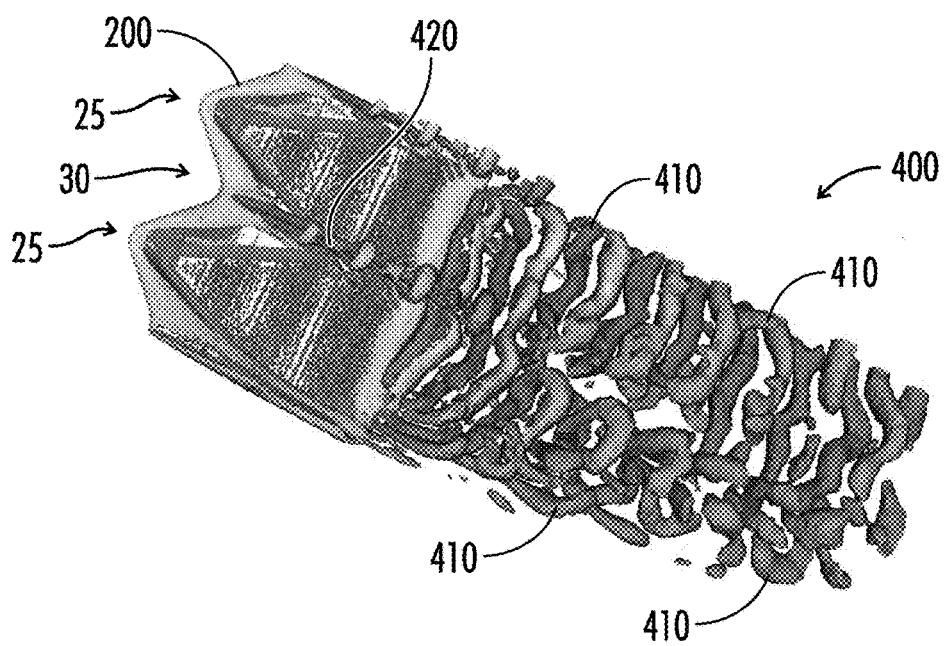
FIG. 4B depicts velocity contours of air passing over a top face of a cutting blade, such as is depicted by FIGS. 1A-1C, at a zero-degree angle of attack.

FIGS. 4A and 4B depict velocity contours of air passing through a contoured notch 30 and over two adjacent protrusions 25 for a bottom face 20 and a top face 50, respectively, of an exemplary cutting blade similar to the one shown in FIGS. 1A-C. In this regard, the airflow is coded using grey-scale shading, with variations in measured velocity indicated by variations in shading present in FIGS. 4A and 4B. Note that the airflow shown by FIGS. 4A and 4B is for a 0° angle of attack. That is, a chord line (i.e., a reference line from the leading edge to the trailing edge) of the blade is roughly parallel with the direction of airflow. Note that, in the exemplary embodiment depicted by FIGS. 4A and 4B, only two protrusions 25 and one contoured notch 30 are visible. In addition, the exemplary airflows depicted in FIGS. 4A and 4B are shown merely for illustrative purposes, and are not intended as limitations on the invention.

As shown by FIGS. 4A and 4B, a very smooth (laminar) airflow is shown over the top face and bottom face of the blade with separation occurring after the trailing edge. A wake 400 is visible behind the trailing edge of the blade in the views depicted by FIGS. 4A and 4B. In this regard, the wake 400 depicts an exemplary degree of turbulence of air flowing across the blade when the blade is oriented at a 0° angle of attack. In other embodiments, the wake 400 may exhibit different levels of turbulence at different speeds and at different distances behind the trailing edge of the blade. The exemplary wake 400 shown by FIGS. 4A and 4B has loosely packed large vortex structures 410, referred to as "vorticity contours," that are relatively elongated and coherent compared to turbulent structures commonly found in wakes of a conventional blade where the airflow tends to separate from the surface of the blade well in advance of the trailing edge.

Note that in FIG. 4A, a vortex 420 is shown in the contoured notch 30 between adjacent protrusions 25 and this vortex 420 extends across the bottom surface of the blade from the leading edge to the trailing edge and into the wake 400. As noted above, the vortex 420 is formed by air channeled through the contoured notch 30 between adjacent protrusions 25. As indicated above, the vortex 420 helps to prevent the airflow from separating from the bottom surface and, thus, reducing turbulence such that airflow remains substantially laminar across the surfaces of the blade. Such reduction in turbulence realizes a corresponding reduction in noise during use of the blade.

Figure 4C:
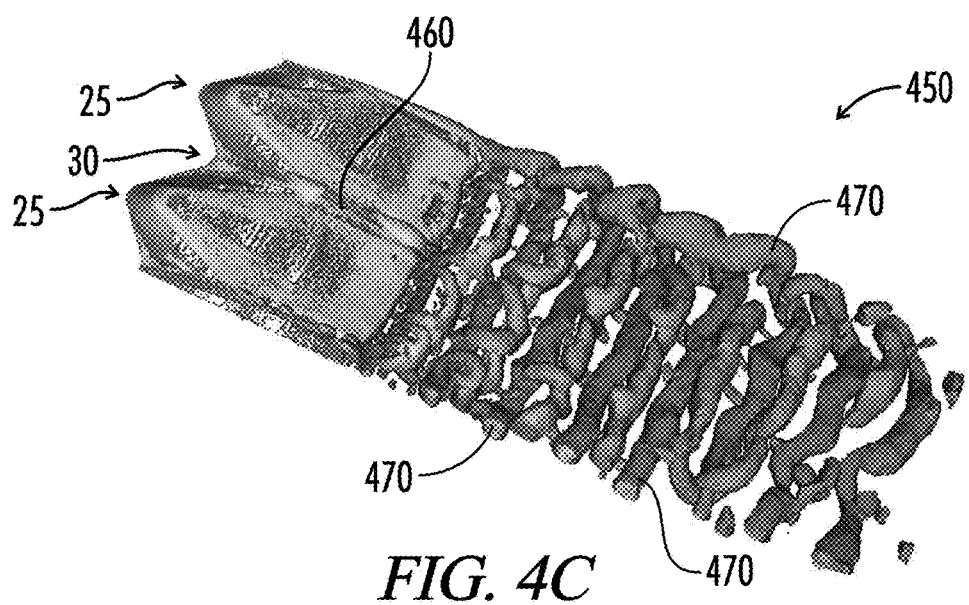
FIG. 4C depicts velocity contours of air passing over a bottom face of a cutting blade, such as is depicted by FIGS. 1A-1C, at a five-degree angle of attack.
Figure 4D:
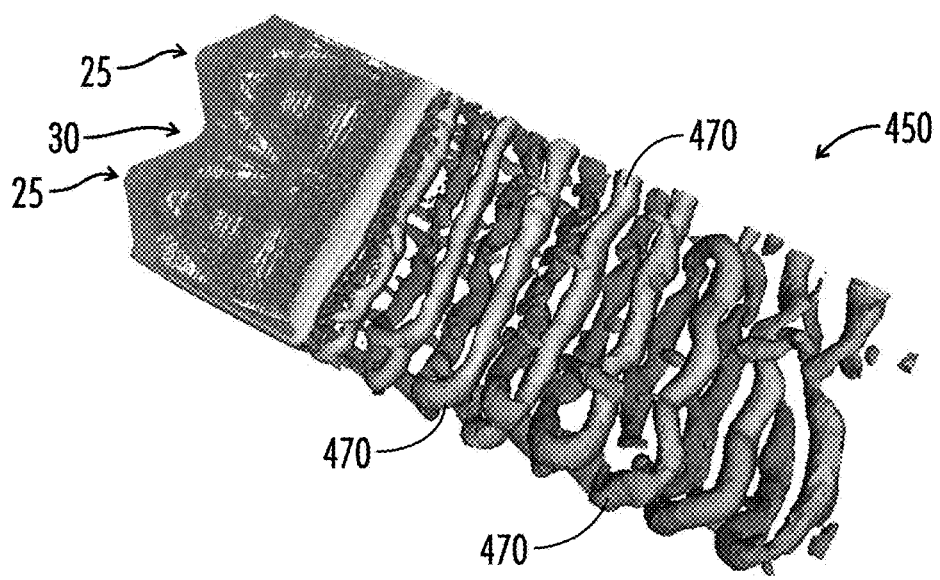
FIG. 4D depicts velocity contours of air passing over a top face of a cutting blade, such as is depicted by FIGS. 1A-1C, at a five-degree angle of attack.

FIGS. 4C and 4D depict velocity contours of air passing through a contoured notch 30 and over two adjacent protrusions 25 for the bottom face 20 and top face, respectively, for a 5° angle of attack (i.e., when a 5° angle exists between the chord line and the direction of airflow). Similar to FIG. 4A, a vortex 460 is shown in FIG. 4C in the contoured notch 30 between adjacent protrusions 25 and this vortex 460 extends across the bottom surface from the leading edge to the trailing edge and into a wake 450 behind the trailing edge. As in FIGS. 4A and 4B, the airflow across the top face and the bottom surface is very smooth from the leading edge to the trailing edge with separation occurring after the trailing edge. Further, there are loosely packed large vorticity contours 470 in the wake 450 exhibiting reduced turbulence compared to the airflow of conventional blades. The vorticity contours 470 in the wake 450 appear more numerous and more densely packed relative to those in the wake 400 of FIGS. 4A and 4B suggesting a more orderly flow with less turbulence.

Figure 5A:
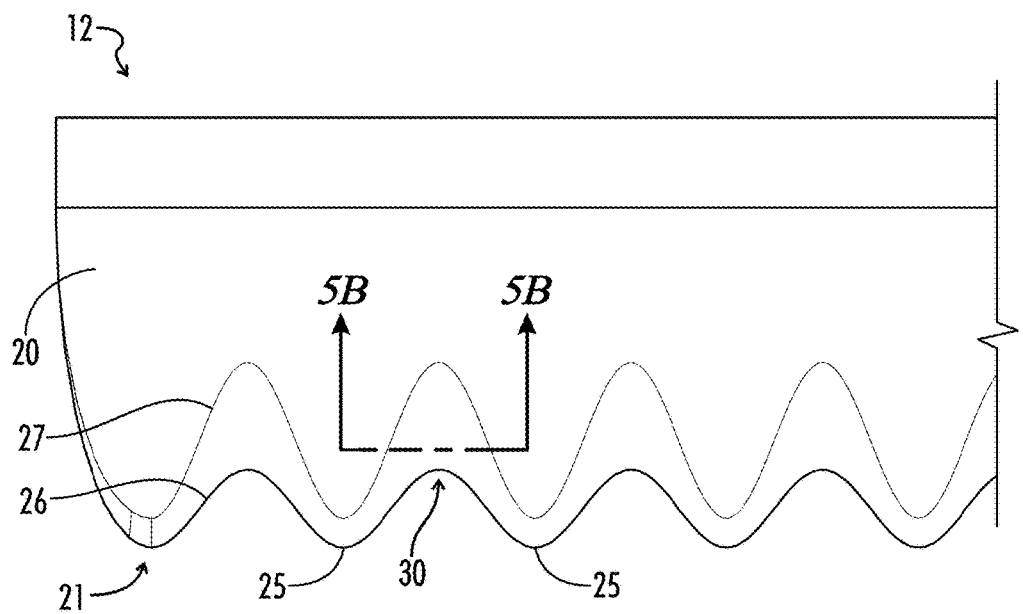
FIG. 5A is a plan view of a cutting blade such as is depicted by FIG. 1A
Figure 5B:
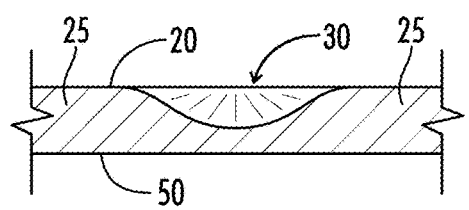
FIG. 5B is a cross-sectional view of a cutting blade such as is depicted by FIG. 1A.

FIG. 5A depicts a plan view of a blade 12, and FIG. 5B depicts a cross-sectional view of a blade 12. In combination, FIGS. 5A and 5B show the respective features of blade 12 discussed supra and infra. Specifically, FIG. 5A depicts a view of bottom face 20, including sinusoids 26 and 27, leading edge 21, protrusions 25 and contoured notches 30 (although FIG. 5A specifies only one contoured notch 30 between two protrusions 25 to aid the reader in viewing FIG. 5B). The perspective of FIG. 5B shows additional detail of the surface contours of each contoured notch 30 and protrusion 25, such as when a cross-section of the blade 12 is viewed from a perspective that is looking at the blade 12 from the direction of cross-sectional arrows "5B" indicated in FIG. 5A. In this regard, FIG. 5B may better illustrate the shaping of each contoured notch 30 with regard to adjacent protrusions and a thickness of the blade 12. In FIG. 5B, it can be seen that, at the location of the cross-sectional lines indicated by FIG. 5A, the protrusions 25 have a cross-sectional thickness that is roughly uniform between bottom face 20 and top face 50. Contoured notch 30 is depicted as an area having a profile that dips smoothly into a thickness of the blade 12 from the bottom face 20. The contoured notch 30 of FIG. 5B may be symmetrical about a center line of the contoured notch 30. In some embodiments, each contoured notch 30 may be symmetrical around a center line that is orthogonal to bottom face 20 and midway between a center point of each adjacent protrusion 25 (i.e., a point where each protrusion 25 extends the furthest and sinusoids 26 and 27 are at a local minimum as depicted in FIG. 5A).

Figure 6:
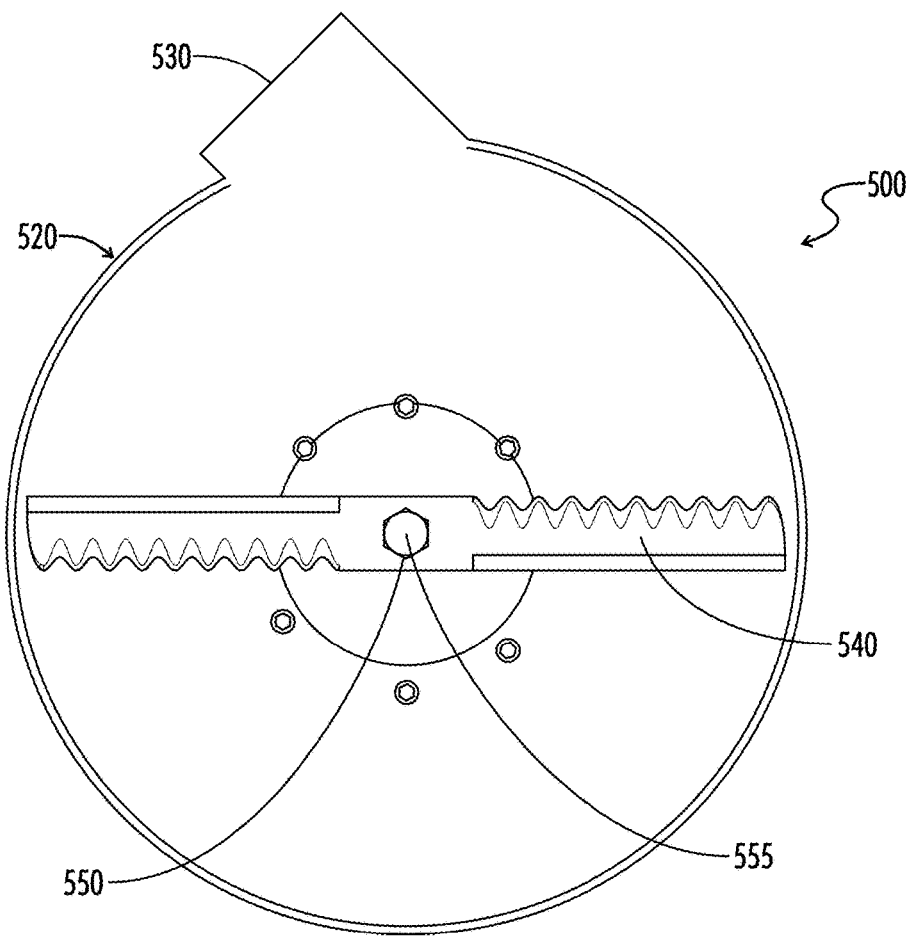
FIG. 6 depicts a lawnmower deck.

FIG. 6 depicts a lawnmower deck 500. The deck 500 depicted by FIG. 6 is roughly circular in shape, and has a deck housing 520 and a deflector shield 530. A blade 540 is depicted in FIG. 6 that spins 360° about its central axis. The blade 540 may be similar or identical to the blade 12 described above in FIGS. 1A-C. In the exemplary embodiment depicted in FIG. 6, the blade 540 rotates 360° about its hub 550 through which a spindle 555 passes. In this regard, the spindle 555 is coupled to the blade 540, and a motor (not shown) of the lawnmower on which the deck 500 is mounted rotates the spindle 555 causing the blade 540 to spin about its hub 550. As the blade rotates, each leading edge of the blade 540 makes contact with and cuts blades of grass. Rotation of the blade 540 generates suction that pulls grass clippings toward the deflector shield 530 and forces them outside of the housing 520. The lawnmower deck 500 shown by FIG. 6 is exemplary, and other types of lawnmower decks are possible in other embodiments.

FIGS. 7A and 7B depict an exemplary embodiment of a lawnmower blade 600. The blade 600 of FIGS. 7A and 7B is the same as the blade 12 of FIGS. 1A-C except that the blade 600 is twisted to provide an angle of attack greater than 0° for each leading edge 621. In this regard, as described above for the blade 12, the blade 600 of FIGS. 7A and 7B has distal ends 615 and 616 and leading edges 621 and trailing edges 623. Each leading edge 621 is notched to form a plurality of protrusions 625 and contoured notches 630, as described above for the blade 12 of FIGS. 1A-C. Similar to FIGS. 1A-C, each protrusion 625 has an outer edge 631 that is curved so that the distal ends 615 and 616 are rounded and smooth. In addition, each trailing edge 623 forms a bevel 635, as described above for the blade 12 of FIGS. 1A-C. However, the blade 600 is twisted such that each leading edge 621 has an angle of attack of about 5°, although other values of the angle of attack (including) 0° are possible in other embodiments.

Note that FIG. 7B depicts a side view of the blade 600. This view depicts a side edge 633 that runs the entire length from one end of the blade 600 to the other encompassing a leading edge 621 and a trailing edge 623 that face in the same general direction. Assuming that blade 600 spins horizontally, the side edge 633 is positioned at a positive angle (e.g., 5°) relative to horizontal (i.e., in the x-direction), which is parallel to a longitudinal axis of the blade 600) at the leading edge 621 where the blade 600 is notched to form protrusions 625 and contoured notches 630. In such example, a bottom face 620 is tilted about by about the same angle (e.g., about 5°). As the side edge 633 approaches the center portion 641, which is flat, the angle of the side edge 633 decreases to zero relative to horizontal. Across the center portion 641 where a hub 645 is located, the side edge 633 is positioned at a zero angle relative to horizontal (i.e., the side edge 633 is parallel with the horizontal direction). As the side edge 633 approaches the bevel 635. The angle of the side edge 633 decreases to a negative angle (e.g., −5°) relative to horizontal. Thus, the blade 600 is twisted where one side of the blade 600 is tilted by a positive angle along the side edge 633 and the opposite end of the blade is tilted by a negative angle along the side edge 633. Through such twisting, each leading edge 621 may have a positive angle of attack, such as 5°, although other angles are possible in other embodiments.

There are various techniques that can be used to fabricate a blade 600 exhibiting a twist, as described above. As an example, in one embodiment, the center portion 641 is heated to make this region malleable so that it can be deformed by hand or otherwise. Specifically, the region between reference lines 648 and 650 and the region between reference lines 649 and 651 are heated with a blowtorch or otherwise. The blade 600 may then be twisted by hand so that the leading edges 621 have a positive angle of attack. Thus, generally, the region between reference lines 648 and 650 is deformed such that it transitions from approximately a 0° angle of attack at reference line 648 to a positive angle of attack (e.g., about 5°) for the leading edge 621 at the reference line 650. The remainder of the leading edge 621 from such point at reference line 650 to its corresponding outer edge 631 exhibits such angle of attack. Similarly, the region between reference lines 649 and 651 is deformed such that it transitions from approximately a 0° angle of attack at reference line 649 to a positive angle of attack (e.g., about 5°) for the leading edge 621 at the reference line 651. The remainder of the leading edge 621 from such point to its corresponding outer edge 631 exhibits such angle of attack.

Leading edges 621 having a positive angle of attack may have various advantages. As an example, such a positive angle of attack causes the blade 600 to function as a propeller such that air is moved by the blade 600 upward in order to pull cut grass away from the blade 600. Many conventional lawnmower blades generate such air movement through the use of flaps on the trailing edges close (within about an inch or two) of the blade tips. However, such flaps can be the source of relatively significant noise. By using a twisted blade 600 with a positive angle of attack on the leading edges 621, as described above, the need for using such conventional flaps can be eliminated, thereby eliminating at least some noise attributable to the flaps.

In addition, having a constant angle of attack across a greater portion of the leading edges 621 (such as across the entire lengths of the leading edges 621, as described above) provides various advantages. As an example, by having a constant angle of attack, the cutting portion of the blade 600 is level helping to achieve a uniform cut of the grass. In addition, keeping adjacent protrusions 625 aligned (e.g., same angle of attack) enhances the formation of vortices within the contoured notch 630 between such adjacent protrusions 625. This may help to reduce turbulence by helping to prevent separation of the airflow from the blade surface. Also, the formation of these vortices helps to mitigate the noise effects of spanwise pumping. In this regard, the vortices generated by air passing through the contoured notches 630 form a barrier to the axial movement of air across the blade 600 toward the blade tips where such air movement results from the centrifugal forces generated by the spin of the blade 600. In this regard, each such vortex extends from a respective contoured notch 630 to the trailing edge 623, as generally shown by FIG. 4B, and interferes with air moving axially across the surface of the blade toward the outer edge 631 or "tip" of the blade 600. This interference generally reduces the strength of the tip vortices that roll off of the blade tips, thereby reducing the noise generated by such tip vortices.

Note also that the blades 12 and 600 are operable to spin in one direction such that the leading edges 21 face the direction of motion, but the blades 12 and 600 can be spun in the opposite direction, if desired. In the embodiment shown by FIGS. 1A and 7A, the leading edges 21 are oriented for counter-clockwise rotation of the blades 12 and 600. In other embodiments, the leading edges 21 having the protrusions 25 may be positioned on opposite sides of the blade 21 such that they are oriented for clockwise rotation.

Figure 8:
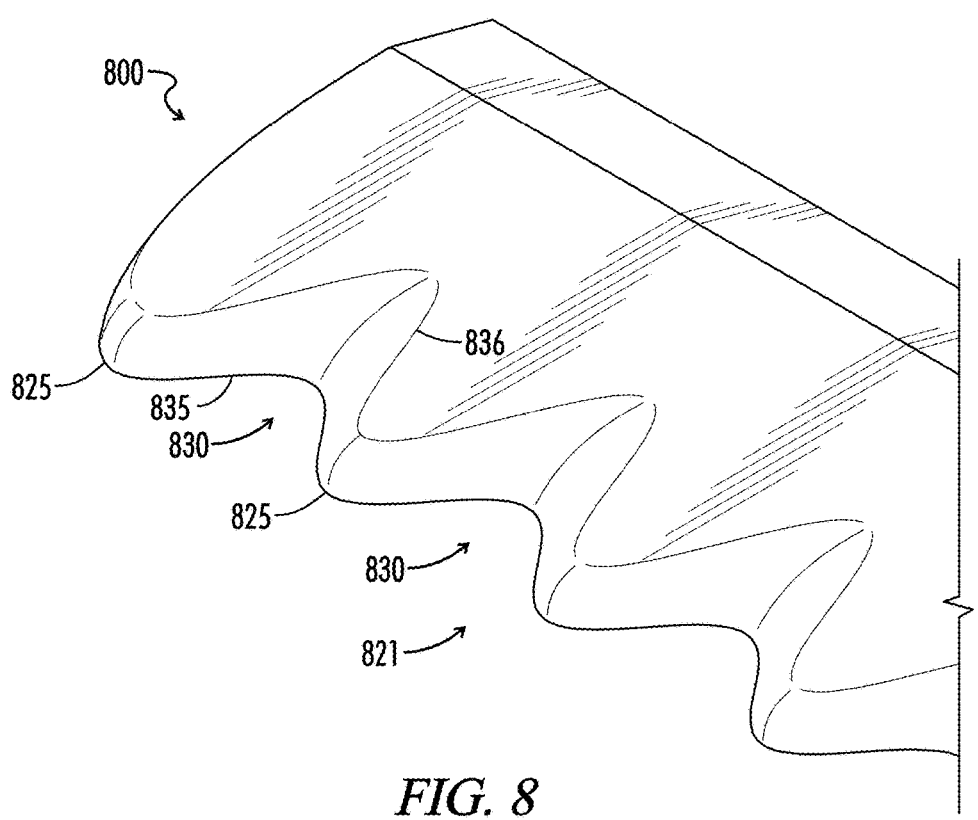
FIG. 8 is a three-dimensional perspective view of an end of a cutting blade.

FIG. 8 shows a close-up detailed view of a lawnmower blade 800. The exemplary embodiment of the blade 800 shown by FIG. 8 is the same as the blade 12 of FIGS. 1A-C. As noted herein, a blade design capable of experiencing reduced turbulence in operation will produce less noise. In general, a square or blunt edge will increase the turbulence of air flowing over it. Thus, airflow experiencing a smooth transition over the surface of a blade will increase the turbulence of the airflow significantly less, resulting in quieter operation of the blade.

In the instant embodiment, airflow transitions smoothly over the surface of the blade 800. The blade 800 of FIG. 8 has a leading edge 821 formed by protrusions 825 and contoured notches 830. The protrusions 825 and contoured notches 830 of the blade 800 form a lower sinusoid 835 and upper sinusoid 836, similar to the sinusoids 26 and 27 pictured in FIG. 1A. In an exemplary embodiment, the periods and phases of the upper sinusoid 836 and lower sinusoid 835 match, but the amplitudes of the lower sinusoid 835 and upper sinusoid 836 differ. By varying the amplitudes of the sinusoids 835 and 836, a series of aerodynamically smooth contoured notches 830 or "grooves" is created between adjacent protrusions 825 or "tubercles" along the leading edge 821 of the blade 800. In general, the greater the difference between amplitudes of the sinusoids 835 and 836, the further into the blade 800 a smooth aerodynamic groove formed by each contoured notch 830 extends (i.e., its "depth" is increased). By increasing the depth of each contoured notch 830, the slope of the leading edge 821 between the lower sinusoid 835 and upper sinusoid 836 is decreased and the depth of the contoured notch 830 is increased, resulting in a smooth phalangic-like groove. In the embodiment of FIG. 8, the amplitude of the upper sinusoid 836 is greater than the amplitude of the lower sinusoid 835, so that each contoured notch 830 has a smooth aerodynamic groove.

Note that smooth transition of airflow over the blade 800 also maintains adherence of airflow to the surface of the blade 800. This occurs during operation when the tublercled leading edge 821 restructures turbulent air it encounters and funnels the air between respective protrusions 825 and over the respective contoured notches 830. As the turbulent air is funneled across the leading edge 821 and over the smooth aerodynamic grooves formed by each contoured notch 830, at least one vortex is formed. This vortex helps the flow of air to adhere to the surface of the blade 800, thereby maintaining reduced turbulence of the airflow and resulting in reduced noise generation while the blade 800 is in use.

Various embodiments of the present disclosure have been described in the context of a cutting blade for a lawnmower. However, it should be emphasized that the techniques described herein can be used to reduce noise generated by other types of spinning blades, such as cutting blades for weed trimmers, edgers, and other devices.

The foregoing is merely illustrative of the principles of this disclosure and various other modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations and modifications thereof, which are within the spirit of the following claims.

Now, therefore, the following is claimed:

1. A cutting blade for use with a lawnmower to reduce sound emitted from the lawnmower, comprising:
   an elongated body having a top face, a bottom face, a first leading edge, a second leading edge, and a trailing edge, wherein the first leading edge is a first side of the elongated body and is notched thereby forming a plurality of contoured notches and a plurality of protrusions in the first leading edge, the plurality of protrusions including an adjacent pair of protrusions with one of the contoured notches located between the adjacent pair of protrusions, wherein the second leading edge is on a second side of the elongated body, wherein the second side is opposite of the first side, wherein the first leading edge forms a sharp tip along the top face for cutting, wherein a cross-sectional profile of the first leading edge is rounded from the tip to the bottom face, wherein the one contoured notch is shaped such that an airflow induced by movement of the elongated body is channeled through the one contoured notch thereby generating at least one vortex within the airflow such that turbulence in the airflow is reduced, and wherein the elongated body has a hole for receiving a spindle of the lawnmower between the first side and the second side.

2. The cutting blade of claim 1, wherein the first leading edge forms a first sinusoid defining the protrusions and the contoured notches.

3. The cutting blade of claim 2, wherein the body has an edge forming a second sinusoid, and wherein a surface of the one contoured notch slopes from the second sinusoid to the first sinusoid.

4. The cutting blade of claim 3, wherein the first sinusoid has a first amplitude, and wherein the second sinusoid has a second amplitude different than the first amplitude.

5. The cutting blade of claim 1, wherein the trailing edge is beveled.

6. The cutting blade of claim 1, wherein the cutting blade is attached to the lawnmower by the spindle, and wherein the spindle passes through the hole.

7. The cutting blade of claim 1, wherein the at least one vortex is sufficient for preventing the airflow from separating from a surface of the blade between the first leading edge and the trailing edge.

8. A lawnmower, comprising:
   a deck housing;
   a spindle coupled to the deck housing; and
   a blade coupled to the spindle, wherein the blade has a top face, a bottom face, a leading edge and a trailing edge, wherein the leading edge is notched thereby forming a plurality of contoured notches and a plurality of protrusions in the leading edge, wherein the leading edge forms a sharp tip along the top face for cutting, wherein a cross-sectional profile of the leading edge is rounded from the tip to the bottom face, and wherein the spindle is configured to rotate the blade such that airflow is induced across a surface of the blade, and wherein the contoured notches are shaped such that the airflow is channeled through the contoured notches to form a plurality of vortices in the airflow such that turbulence in the airflow is reduced thereby reducing sound emitted from the lawnmower.

9. The lawnmower of claim 8, wherein the vortices are sufficient for preventing the airflow from separating from a surface of the blade between the leading edge and the trailing edge.

10. The lawnmower of claim 8, wherein the leading edge forms a first sinusoid defining the protrusions and the contoured notches.

11. The lawnmower of claim 10, wherein the blade has an edge forming a second sinusoid, and wherein a surface of one of the contoured notches slopes from the second sinusoid to the first sinusoid.

12. The lawnmower of claim 11, wherein the first sinusoid has a first amplitude, and wherein the second sinusoid has a second amplitude different than the first amplitude.

13. The lawnmower of claim 8, wherein the trailing edge is beveled.

14. The lawnmower of claim 8, wherein at least one of the vortices extends from the leading edge to the trailing edge thereby interfering with spanwise pumping induced by rotation of the blade.

15. A method for reducing sound emitted from a lawnmower, comprising:
   rotating a lawnmower blade about a spindle coupled to the lawnmower blade, thereby generating an airflow around the lawnmower blade, wherein the lawnmower blade has a top face, a bottom face, a leading edge and a trailing edge, wherein the leading edge is shaped to form a plurality of protrusions and a plurality of contoured notches in the leading edge, wherein the leading edge forms a sharp tip along the top face, wherein a cross-sectional profile of the leading edge is rounded from the tip to the bottom face, and wherein the contoured notches are shaped such that the airflow is channeled through the contoured notches, thereby forming a plurality of vortices in the airflow such that turbulence in the airflow is reduced; and
   cutting grass with the tip.

16. The method of claim 15, wherein the vortices are sufficient for preventing the airflow from separating from a surface of the blade between the leading edge and the trailing edge.

17. The method of claim 15, where at least one of the vortices extends from the leading edge to the trailing edge thereby interfering with spanwise pumping induced by the rotating.

18. The method of claim 15, wherein the leading edge forms a first sinusoid defining the protrusions and the contoured notches.

19. The method of claim 18, wherein the lawnmower blade has an edge forming a second sinusoid, and wherein a surface of one of the contoured notches slopes from the second sinusoid to the first sinusoid.

20. The method of claim 19, wherein the first sinusoid has a first amplitude, and wherein the second sinusoid has a second amplitude different than the first amplitude.

21. The method of claim 15 wherein the trailing edge is beveled.

22. The method of claim 15, wherein the face of the leading edge has a bullnose profile.

23. The method of claim 21, wherein the lawnmower blade is twisted such that an angle of attack of the leading edge changes along the leading edge.

24. The method of claim 23, wherein the angle of attack of the leading edge at an end of the elongated body is greater than 0 degrees.

25. The method of claim 15, wherein the leading edge is a first leading edge on a first side of the lawnmower blade, wherein the lawnmower blade has a second leading edge on a second side of the lawnmower blade, wherein the second side is opposite of the first side, and wherein the lawnmower blade is twisted such that each of the first leading edge and the second leading edge has a positive angle of attack.

26. The cutting blade of claim 1, wherein the face of the first leading edge has a bullnose profile.

27. The cutting blade of claim 5, wherein the elongated body is twisted such that an angle of attack of the first leading edge changes along the first leading edge.

28. The cutting blade of claim 27, wherein the angle of attack of the first leading edge at an end of the elongated body is greater than 0 degrees.

29. The cutting blade of claim 1, wherein the elongated body is twisted such that each of the first leading edge and the second leading edge has a positive angle of attack.

30. The lawnmower of claim 8, wherein the top face faces the deck housing, and wherein the bottom face is opposite of the top face.

31. The lawnmower of claim 8, wherein the face of the leading edge has a bullnose profile.

32. The lawnmower of claim 13, wherein the blade is twisted such that an angle of attack of the leading edge changes along the leading edge.

33. The lawnmower of claim 32, wherein the angle of attack of the leading edge at an end of the blade is greater than 0 degrees.

34. The lawnmower of claim 8, wherein the leading edge is a first leading edge on a first side of the blade, wherein the blade has a second leading edge on a second side of the blade, wherein the second side is opposite of the first side, and wherein the blade is twisted such that each of the first leading edge and the second leading edge has a positive angle of attack.

* * * * *